United States Patent [19]
Byrd et al.

[11] 3,860,168
[45] Jan. 14, 1975

[54] PLURAL RANGE GAUGE

[75] Inventors: Robert V. Byrd; Clyde P. Mason, Jr., both of Columbus, Ohio

[73] Assignee: Industrial Nucleonics Corporation, Columbus, Ohio

[22] Filed: Oct. 13, 1971

[21] Appl. No.: 188,712

[52] U.S. Cl............. 235/151.3, 444/1, 235/151.35, 73/73
[51] Int. Cl........................ G01n 33/34, G06j 3/00
[58] Field of Search................ 235/151.3, 151.35; 162/198, 252, 263; 73/73; 444/1

[56] References Cited
UNITED STATES PATENTS

| | | | |
|---|---|---|---|
| 3,073,153 | 1/1963 | Petitjean | 73/73 |
| 3,524,063 | 8/1970 | Mangan | 250/83.3 |
| 3,536,258 | 10/1970 | Rocheleau | 235/151.3 |
| 3,622,448 | 11/1971 | Adams et al. | 235/151.35 X |
| 3,625,812 | 12/1971 | Gudaz et al. | 235/151.35 X |
| 3,650,891 | 3/1972 | Dahlin | 235/151.35 X |
| 3,666,621 | 5/1972 | Adams | 235/151.35 X |
| 3,668,401 | 6/1972 | Shah et al. | 250/83.6 |

Primary Examiner—Charles E. Atkinson
Assistant Examiner—Edward J. Wise
Attorney, Agent, or Firm—William T. Fryer, III; Allan M. Lowe; C. Henry Peterson

[57] ABSTRACT

A nucleonic detector for monitoring a material property derives a first signal approximately exponentially related to the property value. The first signal is subtracted from a suppression signal, with the resulting difference signal fed to a variable gain amplifier. The output signal of the variable gain amplifier is fed to a digital computer that determines in which of a plurality of ranges the first signal lies. The range determination controls the amplitude of the suppression signal and gain of the amplifier, whereby the amplifier output signal is approximately a linear variation as a function of the property over each of the ranges and extends between the same first and second limits in each of the ranges. The digital computer responds to the variable gain output signal and the range determination to compute a theoretical value for the material property in accordance with $BW_T = ax+b$, where: $x$ = the magnitude of the variable gain amplifier output signal, and $a$ and $b$ are constants dependent upon the range determination such that $BW_T$ is a continuous straight-line function over all of the ranges taken together. The computer responds to the value of $BW_T$ to apply a binomial correction thereto approximately to compensate for the deviation of the first signal from a true exponential relationship between it and the material property.

72 Claims, 5 Drawing Figures

PLURAL RANGE GAUGE

FIELD OF INVENTION

The present invention relates generally to gauging systems and, more particularly, to a system for and method of calibrating each of a plurality of gauges adapted to monitor a property nonlinearly related to the gauge output response.

BACKGROUND OF THE INVENTION

Many gauging systems include a detector for deriving an output signal nonlinearly related to a property value being monitored. For example, a nucleonic gauge for measuring the basis weight (weight per unit area) of a paper sheet includes a detector and associated circuitry for deriving an output signal that is approximately related to basis weight as an exponential, decreasing function. The output signal of the detector circuitry is fed to gauging circuitry including a subtraction circuit also responsive to a supression signal. The difference signal derived from the subtraction network is fed to a variable gain amplifier which derives an output signal over a number of ranges. The suppression signal and gain of the amplifier are selected on an a priori basis to fit a calibration curve for a particular nucleonic detector and grade of paper being monitored. The values of suppression and gain are changed each time the paper maker changes the grade of paper being monitored by the detector. With this prior art arrangement, it is, therefore, necessary to establish the suppression and variable gain, i.e., span, factors for each detector and each grade independently of all other detectors because the different detectors have differing characteristics. Hence, considerable effort is devoted to establishing the suppression and span factors for each detector prior to installation, i.e., during calibration.

With prior art systems, the output of a gauge is applied to a digital computer which takes the logarithm of the signal to derive the basis weight indication. The logarithmic conversion is generally performed approximately by a polynomial series, involving many terms. Computation of logarithm by a polynomial conversion is quite expensive in terms of computer usage time.

BRIEF DESCRIPTION OF THE INVENTION

In accordance with the present invention, each of a plurality of gauges having different output responses nonlinearly related to a property being measured, which output responses are approximately equal to a theoretical response versus the property, are calibrated by applying at least one factor that is the same for all of the gauges to the output responses of the gauges. The factor can be the same for all gauges since it is determined by the theoretical response, rather than the actual gauge response. The factor thereby modifies the gauge response. The modified response is altered by an amount indicative of the deviation of each individual gauge from the theoretical response. The invention has particular utility in conjunction with gauges which derive an output signal over many amplitude ranges. Typically the gauge response is altered by two factors, slope and intercept point on a plot of output response versus property values.

In accordance with a particular embodiment of the present invention there is disclosed a new and improved system for converting the response of a detector into an indication of material property wherein suppression and variable gain or span factors are set in response to a determination of which a plurality of amplitude ranges the amplitude of the detector output signal falls. The suppression and span factors are set so that the gauge output, at the output of the variable gain amplifier, is approximately linearly related to the property value within each of the plural ranges. Over each of the ranges, the gauge output signal varies over a permissible range and represents approximately a piece-wise linear approximation of a logarithmic curve indicative of a theoretical exponential relationship between detector output signal and basis weight. The values of suppression and span are identical for all gauges, regardless of the individual gauge characteristics and the grade of paper being manufactured, and are dependent solely upon the theoretical exponential relationship between detector output signal and basis weight. Thereby, there is no need to determine on an a priori basis suppression and span factors for each individual detector and grade of paper being monitored.

A digital computer responds to the gauge output signal to make the range determination and set the values of span and suppression for the gauge. The computer also responds to the range determination and gauge output signal magnitude ($x$) to derive a theoretical basis weight signal ($BW_T$) in accordance with the linear straight-line relationship $BW_T = ax+b$. The values of a and b are slope and intercept values which are different for each range of the gauge output signal.

The theoretical basis weight signal is converted into an accurate indication of the actual basis weight of the monitored sheet by the digital computer. The computer responds to $BW_T$ to apply a correction factor dependent upon the gauge characteristics and grade of paper being monitored. The correction factor has a polynomial form that can be represented as the same binomial or parabolic function over all of the ranges. The polynomial conversion of theoretical basis weight to actual basis weight provides an accurate determination of weight in the vicinity of a target weight for a particular grade and provides accurate compensation for changes in the composition of different types of paper being monitored.

A further feature of the invention is that the several ranges overlap each other. Overlapping of the several ranges provides accurate basis weight measurement when the measurement signal goes beyond one of the range decision points and range switching has not yet been accomplished. Overlapping also obviates the requirement for frequent automatic range changing if the signal dwells in an amplitude region in the vicinity of a range boundary.

It is, accordingly, an object of the present invention to provide a new and improved system for and method of calibrating a plurality of gauges having different output responses nonlinearly related to a property value.

An additional object is to provide a new and improved system and method for converting the response of a gauge into an indication of a material property monitored by the gauge.

Another object of the invention is to provide a new and improved system for and method of converting the nonlinear response of a gauge output into an accurate indication of a material property monitored by the gauge over a wide range of gauge output values.

A further object of the invention is to provide a new and improved system for and method of converting the output of a gauge which is approximately related to an exponential function into a linear function over many different ranges of the gauge output signal.

An additional object of the invention is to provide a new and improved system for and method of converting the output signal of a nucleonic detector into an indication of material property wherein span and suppression signals supplied to a gauge responsive to the detector are selected on an a priori basis independently of gauge characteristics and properties of the material being monitored.

The above and still further objects, features and advantages of the present invention will become apparent upon consideration of the following detailed description of one specific embodiment thereof, especially when taken in conjunction with the accompanying drawing.

DETAILED DESCRIPTION OF THE DRAWING

Figure 1:
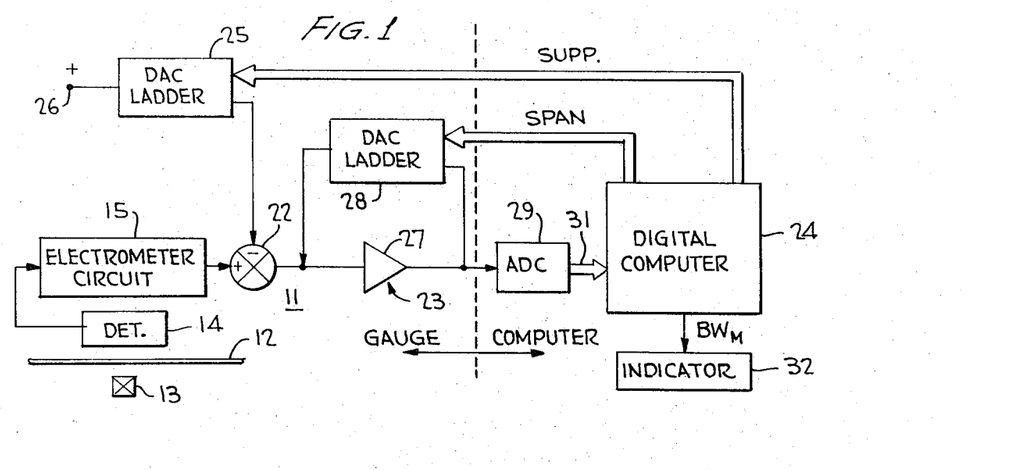
FIG. 1 is a block diagram of the apparatus with which the present invention is particularly adapted to be utilized.

Reference is now made to FIG. 1 of the drawing wherein there is illustrated a gauge 11 for monitoring the basis weight (weight per unit area) of paper sheet 12 as the sheet passes through the gauge. The gauge comprises a nucleonic source 13, preferably a beta ray source, and a detector 14 which derives an output signal which is fed to electrometer circuit 15 which may be of any conventional type, such as disclosed in U.S. Pat. No. 3,654,468. The output signal of electrometer circuit 15 is a dc, analog voltage indicative of the basis weight of sheet 12, as determined by the absorption of the sheet of the nucleonic energy derived from source 13.

Figure 2A:
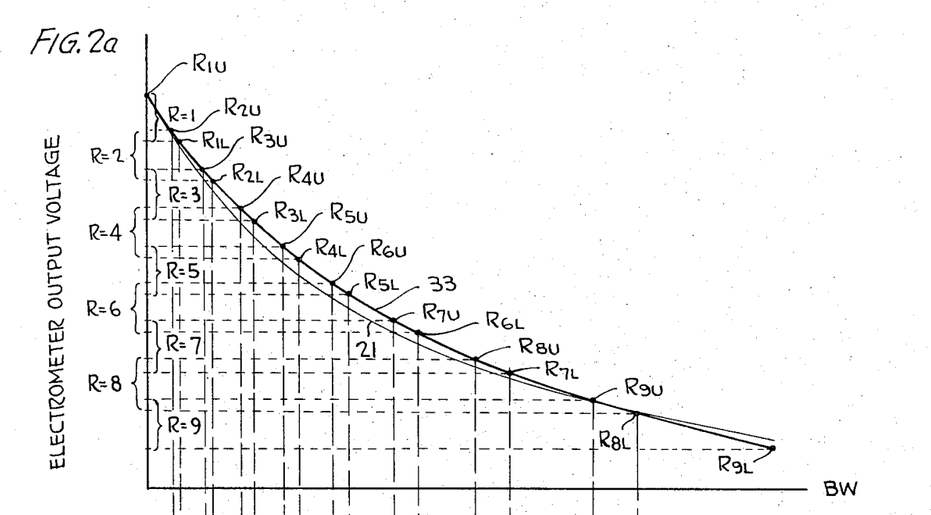
FIGS. 2A, 2B and 2C are graphs useful in describing the operation of the system of FIG. 1.

The output signal of electrometer circuit 15 is approximately an exponentially decreasing curve versus basis weight, as illustrated in FIG. 2A by curve 21. It is noted from FIG. 2A that for a basis weight of zero the output signal amplitude of electrometer circuit 15 is a finite, maximum voltage. For increasing values of basis weight, the amplitude of curve 21 decreases in approximately an exponential manner. Regardless of the basis weight value of sheet 12 the amplitude of curve 21 never drops to zero. Curve 21 varies considerably in amplitude and slope for the different basis weight values.

To provide an accurate indication of the output of electrometer circuit 15 versus the basis weight of sheet 12, the electrometer circuit output is split into a number of amplitude ranges. Within each range, the output signal of gauge 11 varies between first and second predetermined voltages, i.e., has only a limited permissible range of values. For one specific embodiment, the permissible range of values is between zero and eight volts. To enable the gauge output signal to vary substantially as a linear function between the limited permissible values over each range the sensitivity of the gauge, as determined by the gain thereof, is set to be different over each of the ranges. In addition, a different suppression factor for the d.c. voltage derived from electrometer circuit 15 is supplied by gauge 11 over each range.

To these ends, gauge 11 includes difference network 22 and variable gain amplifier 23. Difference network 22 is responsive to the output signal of electrometer circuit 15 and a dc analog voltage commensurate with a suppression factor which is different for each range. The magnitude of the suppression factor is determined by the maximum voltage in each range, as derived by electrometer circuit 15. The maximum voltage in each range is set on an a priori basis, as described infra, by digital computer 24. A digital signal derived by computer 24, indicative of the suppression factor, is supplied to digital-to-analog converter ladder network 25, which is powered by a regulated dc voltage connected to terminal 26. Ladder network 25 derives the dc output voltage, commensurate with the suppression factor of electrometer circuit 15, that is fed to network 22.

The output voltage of network 22, equal to the difference between the maximum voltage for the range of the output signal of electrometer circuit 15 and the actual output voltage of electrometer circuit 15, is fed to the input of amplifier circuit 23. Amplifier circuit 23 includes a dc, operational, high gain, polarity reversing amplifier 27 and a negative feedback network including digital-to-analog converter ladder 28. Ladder circuit 28 controls the gain of amplifier 27 in response to a span, i.e., gauge sensitivity, indicating digital signal derived from computer 24. The span indicating digital signal derived from computer 24 is derived by the computer in response to the range determination thereof. The span digital signal supplied by computer 24 to ladder network 28 controls the gain of amplifier 23 so that the output signal of the amplifier, over each range, varies between the permissible range of values, for example from zero to eight volts. Over each of the ranges, the gain of amplifier 23 is determined on an a priori basis and is set in response to stored signals in digital computer 24.

The output signal of amplifier 23 is supplied to analog-to-digital converter 29, which derives a multi-bit, parallel, binary output signal that is fed by bus 31 to the input of digital computer 24. Digital computer 24 samples the output signal of analog-to-digital converter 29 once every 0.1 second and responds thereto to determine the range of the output signal of electrometer circuit 15. In response to the range determination made by computer 24, the computer derives the suppression and span digital signals supplied to ladder circuits 25 and 28.

Digital computer 24 includes the elements usually included in a general purpose digital computer; viz: input bus, output bus, arithmetic unit and memory, which is divided into a high speed unit that is used during each cycle of computer operation and a low speed unit wherein a priori determined signal magnitudes are stored. The memory stores a priori determined digital signals commensurate with the suppression and span values for each of the ranges. Each time the computer senses a change in the range of the output signal of electrometer circuit 15 a new set of suppression and span digital signals is supplied to ladders 25 and 28. The values for suppression and span are determined on an a priori basis for a theoretical exponential decreasing function relating the output of electrometer circuit 15 to the basis weight of sheet 12. These values are determined independently of the source 13, detector 14 and electrometer circuit 15 being employed and independently of the properties of the sheet 12 being monitored. Thereby, the span and suppression values stored in the memory can be the same for all installations and no fitting thereof is required for a particular installation or grade or type of paper being monitored.

Computer 24 performs the range determination by comparing the magnitude of the output signal of gauge 11, as indicated by the output signal of converter 29, with fixed boundary values within the permissible range of values of the output signal of amplifier 23. For example, if the output signal of amplifier 23 can vary between zero and eight volts, the boundary ranges are selected as 0.4 and 7.6 volts. In response to the output of converter 29 indicating that the output signal of amplifier 23 is less than 0.4 or greater than 7.6 volts, a range change is initiated within computer 24 and the values of the suppression and span signals supplied to ladder networks 25 and 28 are changed. By setting the range boundaries within the permissible variation of the output signal of amplifier 23 as stated and sampling the output signal of converter 29 once every 0.1 second, it has been found that the output signal of amplifier 23 is virtually never outside of the permissible range of zero to eight volts.

Computer 24 responds to the output signal of converter 29 and the range indication stored therein to derive a theoretical indication of basis weight. The computer derives the theoretical basis weight indication, in effect, by a piece-wise linear approximation of the theoretical exponential relationship of the output of electrometer 15 to basis weight over each of the ranges. Thereby, over each range, the theoretical basis weight incication derived by computer 24 is calculated in accordance with $$BW_T = ax + b \qquad 1$$

where:
  $BW_T$ = theoretical basis weight,
  $a$ = a slope factor for the range in which the computer is operating,
  $b$ = a predetermined intercept point for a straight line in the range over which the computer is operating, and
  $x$ = the output signal of converter 29.

The slope and intercept values ($a$, $b$) are stored in the memory of computer 24 for each of the several ranges and are retrieved from memory and combined with the value of $x$, as derived from converter 29, to solve Equation (1) over each range.

To convert the theoretical basis weight signal derived by the computer in accordance with Equation (1) into a signal commensurate with the actual basis weight of paper sheet 12 for a particular facility and grade of paper being monitored, digital computer 24 also includes a polynomial correction factor. The polynomial is independent of the range determined by computer 24 and is set on an a priori basis for each facility, as governed by the characteristics of nucleonic source 13, detector 14, and electrometer circuit 15 for the several grades of paper being tested for basis weight. Thereby, the a priori determined coefficients of the polynomial are selected and retrieved from memory in response to commanding grade change for the sheet being monitored. For a particular grade or paper classification, polynomial coefficients are established on an a priori basis by calibration at the time the gauge is manufactured.

It has been found that a second order polynomial, of the form:

$$BW_M = c(BW_T) + d(BW_T)^2 \qquad 2,$$

where:
  $c$ and $d$ are calibration constants for a particular grade of paper, and
  $BW_M$ = actual basis weight of the measured sheet, provides an accurate correction factor for correcting theoretical value of Equation (1) into a true measure of basis weight. The value of $BW_M$ derived by computer 24 is fed to basis weight indicator 32 once every 0.1 second, the same frequency at which the $BW_T$ calculation is performed. Indicator 32 can be in the form of a visual indicator, a digital chart recorder or any other suitable indicator of the type well known to those skilled in the art.

Figure 2B:
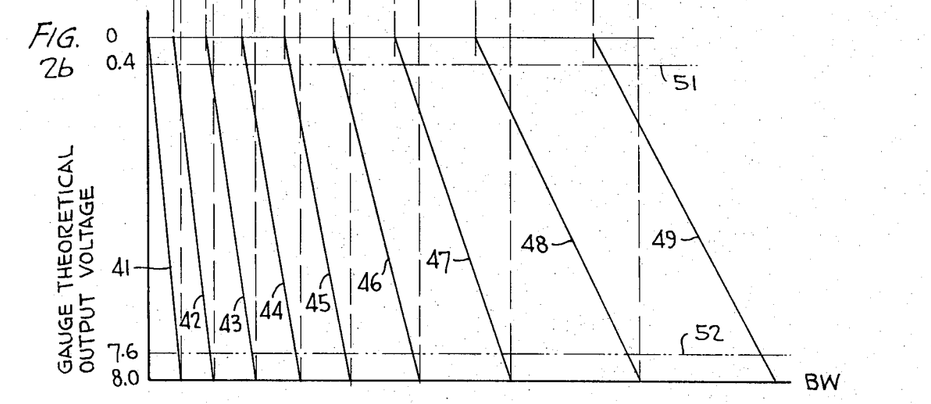
Figure 2C:
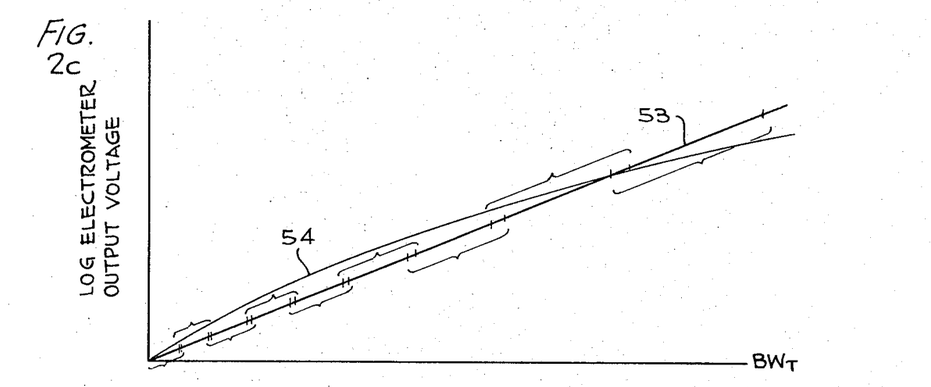

Reference is now made to FIGS. 2A–2C of the drawing wherein there are illustrated response curves useful for providing a more complete understanding of the present invention. In FIG. 2A, the basis weight of an exemplary sheet 12 is plotted by curve 21 as a function of the output voltage of electrometer circuit 15, while curve 33 is a plot of the basis weight versus the output voltage of electrometer circuit 15, assuming a theoretical, true exponential relationship between the two parameters. While curves 21 and 33 are illustrated for clarity as being widely displaced from each other, it is to be understood that in actual practice they are preferably approximately the same. The possible deviation between the two curves is on the order of 15%. The output voltage of electrometer circuit 15 is divided into nine equal amplitude ranges ($R = 1, R = 2...R = 9$). All of the ranges, except the lowest and highest amplitude ranges, overlap with the adjacent ranges in each direction by the same, fixed amount; in the alternative the overlap can be by the same, fixed percentage of theoretical basis weight. The highest amplitude range ($R = 1$) overlaps only with the second range ($R = 2$), while the lowest amplitude range ($R = 9$) overlaps only with the penultimate range ($R = 8$).

The intersection points ($R_{1U}$, $R_{2U}$, $R_{1L}$, $R_{3U}$, $R_{2L}$, $R_{4U}$... $R_{9U}$, $R_{8L}$, $R_{9L}$) between the boundary of each of the ranges and curve 33 are projected in FIG. 2B into the minimum and maximum permissible values of the gauge output, as derived at the output terminal of amplifier 23. In FIG. 2B, there is shown a series of curves representing the theoretical output voltage of gauge 11, as derived from amplifier 23, over each of the nine ranges illustrated in FIG. 2A whereby the segment of curve 33 between $R_{1U}$ and $R_{1L}$ is projected into line 41, the segment of curve 33 between $R_{2U}$ and $R_{2L}$ is projected into line 42 etc. for the remaining segments of curve 33 and lines 43–49.

In FIG. 2B, the responses of the gauge over the nine ranges indicated by FIG. 2A are illustrated as straight lines 41–49. The slope of each of the straight lines 41–49 equals the average slope of curve 33 in each of the ranges ($R = 1$) to ($R = 9$). The change in slope of curve 33 over each of the ranges is sufficiently low to enable each of the exponential segments accurately to be converted into a straight line segment. The straight line segments 41–49 extend from zero to eight volts, with the zero point for each of the lines being the intersection point of curve 33 with the maximum value of electrometer output voltage for the particular range, and the eight volt point of each of lines 41–49 being commensurate with the intersection point of the minimum value of a particular range and curve 33. For purposes of convenience and to graphically illustrate the similarity of slopes between the segments in FIG. 2A and FIG. 2B, the +8 volt output of gauge 11 is illustrated as being below the zero volt level of the gauge output. The responses indicated by straight line segments 41–49 are derived by gauge 11 over each of the ranges by proper a priori selection of suppression and span factors for each of the ranges.

Digital computer 24 responds to the nine responses 41–49 of converter 29 by determining if the output of converter 29 is in the region between lines 51 and 52. It has been found through experimentation that for a gauge having the stated permissible range of values (0 to 8 volts) that range boundaries 51 and 52 are satisfactorily set equal to 0.4 and 7.6 volts, respectively. It is noted that the overlap between the several ranges of the output voltage, of electrometer, indicated in FIG. 2A, is carried over into FIG. 2B.

The different straight-line segments 41–49 of FIG. 2B, each having a different slope and intercept point, are transformed into a continuous, straight-line relationship between theoretical basis weight and the logarithm of the output voltage of electrometer circuit 15, as indicated in FIG. 2C, a plot of the logarithm of the output voltage of circuit 15 versus basis weight. In FIG. 2C, each of the straight-line segments 41–49 of FIG. 2B is changed in slope and intercept point so that over each range the continuous straight line 53 is formed. The transformation of curves 41–49 into straight line 53 is performed by substitution of the appropriate $a$ and $b$ factors for the range being considered and by responding to the output of analog-to-digital converter 29, as well as the value of $x$, which varies between zero and +8 volts along the several straight lines 41–49. Straight line 53 intersects the origin of the Cartesian coordinate system of FIG. 2C so that a zero basis weight value is translated into a zero signal by computer 24.

To compensate for the difference between theoretical exponential curve 33 and the actual gauge response 21, a correction factor in accordance with Equation (2) is applied to the calculated value of $BW_T$. A typical correction factor for one gauge and grade of paper is indicated by the parabolic curve 54. The coefficients of curve 54 are adjusted so that the parabolic curve most accurately fits the actual, response 21, in the region where the target for a particular grade lies. Hence, if a particular grade has a target value of 50 pounds per ream, it may be expected that the basis weight nominally varies between 45 and 55 pounds per ream. Therefore, the parabolic curve 54 is fitted with greatest accuracy to the theoretical curve 53 in the region between 45 and 55 pounds per ream when a grade of paper having a target value of 50 pounds per ream is being measured by gauge 11. In response to the paper maker changing grade, the coefficients $c$ and $d$ in Equation (2) are changed in response to an operator input signal for grade change so that a different parabolic correction curve is applied to the theoretical curve 53.

Figure 3:
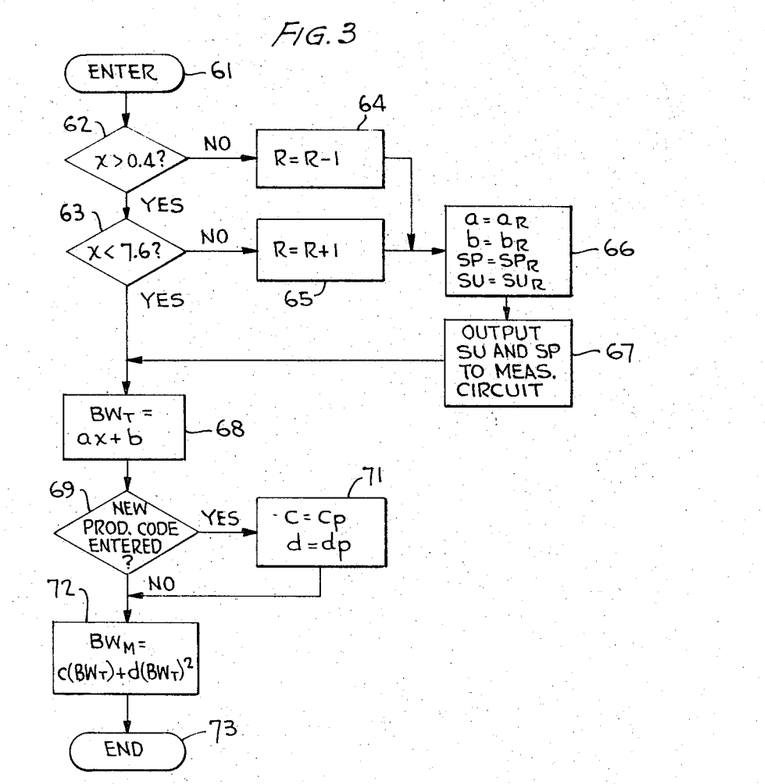
FIG. 3 is a flow diagram to assist in describing the operation of the digital computer of FIG. 1.

Reference is now made to FIG. 3 of the drawing wherein there is illustrated a flow diagram of operations performed by digital computer 24 once every 0.1 second to control the magnitude of the signals supplied to ladder networks 25 and 28 and calculate the value of $BW_M$. Each of the operations indicated in FIG. 3 is performed once every tenth second after the subroutine is entered, as indicated by operation 61.

Initially, the output of analog-to-digital converter 29 is tested to determine if it is in the same range as it was in during the preceding operating cycle of computer 24. In other words, the value of $x$, the output signal of gauge 11, is tested to determine if it falls between the range value boundaries indicated by lines 51 and 52, FIG. 2B. The first step 62 of the range determination is performed by first comparing in the computer arithmetic unit the value of $x$ with the 0.4 volt level indicated by line 51. A signal commensurate with the 0.4 volt level is retrieved from an appropriate memory location and compared in the computer arithmetic unit with the value of $x$ fed to the computer from converter 29 during operation 62. In response to the value of $x$ exceeding 0.4 volts, operation 63 is performed to determine if the value of $x$ is less than the 7.6 volt level with which line 52 is commensurate. In response to operation 63 indicating that the value of $x$ is less than 7.6 volts, an indication is provided that the value of $x$ during the cycle being considered is in the same range as during the preceding cycle and there is no need to change the values of the suppression and span signals supplied by computer 24 to ladders 25 and 28 or the values of $a$ and $b$ in Equation (1).

If during operations 62 or 63 it is found that the value of $x$ is less then 0.4 volts or greater than 7.6 volts, a branch in the program is reached and the range value changed. To this end, in response to operation 62 indicating that the value of $x$ is less than 0.4 volts, computer 24 is stepped to operation 64 wherein the range value is decremented by a count of one. This operation is performed by feeding the range value previously stored in memory to the arithmetic register and by subtracting a count of one from the value in the arithmetic unit to derive a new range value of (R-1) that is then fed back to memory. If the comparision operation 63 indicates that the value of $x$ is greater than 7.6 volts, operation 65 of the program is reached to increment the range value by a count of one to derive a new range value of (R+1). Incrementing the range value is performed in a similar manner to the decrementing operation 64.

Upon the conclusion of either operation 64 or operation 65, whichever one may be performed during a particular operating cycle, operation 66 is reached. In operation 66, the values of $a$ and $b$, as well as span and suppression, for the particular range are retrieved from the low speed portion of memory and fed to the high speed portion of memory from which they are retrieved once every 0.1 seconds. The values of $a$ and $b$, as well as span and suppression, retrieved from the low speed portion of memory replace the values thereof previously stored in the high speed portion of memory. After the new values of suppression and span have been fed to the high speed memory they are fed during operation 67 to a static output memory of computer 24 where they replace the previous values of suppression and span. Thereby, the output memory constantly derives suppression and span values for the particular range and these values are altered only in response to changes in the range determination made during operations 64 or 65. The values of suppression and span transferred to the output memory during operation 67 are fed to ladders 25 and 28 which are thereby set to the values of suppression and span stored in the output memory.

Upon the completion of operation 63 indicating that the signal is within the range previously established or upon completion of operation 67, the last operation in the branch utilized to establish new range values and establish new values of suppression, span, $a$ and $b$, the theoretical basis weight $BW_T$ is calculated during operation 68. In operation 68, the value of $x$ supplied to the computer during the cycle being considered is combined with the values of $a$ and $b$ to construct the linear, straight-line relationship indicated by line 53, FIG. 2C.

The operation sequence shown is used to simplify explanation. It should be noted, however, that according to preferred practice operation 68 should occur between operations 61 and 62. This avoids calculating one incorrect $BW_T$ value when a range change is made. The incorrect value (see operation 66) would result from the use of $a_R$ and $b_R$, rather than $a$ and $b$, with an $x$ value derived with gauge span and suppression values SP and SU rather than $SP_R$ and $SU_R$.

After the calculation of theoretical basis weight for the exponential response 33 is calculated during operation 68, the appropriate parabolic correction is applied. The first step in applying the parabolic correction is operation 69, a determination as to whether a new product code has been entered by the operator into the computer 24. A new product code is entered when the paper maker changes grade so that paper having a first average basis weight is monitored, rather than paper having a second average basis weight. In response to operation 69 sensing that the paper maker has entered a new product code, the curvature of parabolic correction curve 54 is changed during operation 71. To this end, in operation 71, the values of $c$ and $d$ formerly stored in the high speed memory are changed to new values dependent upon the new grade of paper. The new values of $c$ and $d$ ($c_p$ and $d_p$) are determined on an a priori basis and supplied to high speed memory from the low speed portion of the computer memory.

Upon completion of operation 71 or operation 69 indicating that the same product code or grade of paper is being fabricated, the program is sequenced to operation 72. In operation 72, the corrected value of basis weight $BW_M$, is computed in accordance with Equation (2) in response to the previously computed value of $BW_T$ (operation 68) and the values of $c$ and $d$ now stored in high speed memory. Upon the completion of operation 72, the subroutine involving determination of basis weight is completed and is exited in operation 73.

While there has been described and illustrated one specific embodiment of the invention, it will be clear that variations in the details of the embodiment specifically illustrated and described may be made without departing from the true spirit and scope of the invention as defined in the appended claims. For example, the principles of the invention are applicable to measuring properties of other types of materials, as long as the response of the gauges can be approximated as theoretical responses versus property values.

We claim:

1. In combination, a nucleonic detector for deriving a first signal substantially exponentially related to a process variable being monitored by the detector, first means for determining in which one of a plurality of signal amplitude ranges the first signal falls, means responsive to the determination for transforming the first signal into a second signal having approximately a linear variation as a function of the property over each of the ranges, said second signal extending between the same first and second limits in each of said ranges, and means responsive to the second signal for deriving a third signal having a magnitude $BW_T$ in accordance with $$BW_T = ax + b$$

where:
$x$ = the magnitude of the second signal,
$a$ and $b$ are constants dependent on the determination
such that $BW_T$ is a continuous straight line function over all of the ranges taken together.

2. The combination of claim 1 further including means responsive to the third signal for applying a correction thereto approximately indicative of the deviation of the first signal from a true exponential relationship of the process variable.

3. The combination of claim 1 wherein the transforming means includes means for linearly combining a suppression signal and the first signal to derive a difference signal indicative of the difference between the first and suppression signals, variable gain means responsive to the difference signal, and means responsive to the range determination for controlling the magnitude of the suppression signal and the gain of the variable gain means.

4. The combination of claim 1 wherein adjacent ones of the signal amplitude ranges overlap each other.

5. A system for deriving an indication of the magnitude of a process variable derived from a detector deriving a first signal nonlinearly related to the process variable comprising means for transforming the first signal into a second signal having approximately a linear variation as a function of the property over each of a plurality of signal amplitude ranges for the first signal ranges, said second signal extending between the same first and second limits in each of said ranges, digital computer means responsive to the second signal for determining in which one of the plurality of signal amplitude ranges the first signal falls and for controlling the transforming means in response to the range determining means, said computer means including means for deriving a third signal having a magnitude $BW_T$, in accordance with $$BW_T = ax + b$$

where:
$x$ = the magnitude of the second signal,
$a$ and $b$ are constants dependent on the determination such that $BW_T$ is a continuous function over all of the ranges taken together.

6. The system of claim 5 wherein the computer includes means for applying a correction to the third signal, said correction being approximately indicative of the deviation of the first signal from a true relationship of the process variable.

7. The system of claim 5 wherein the transforming means includes means for linearly combining a suppression signal and the first signal to derive a difference signal indicative of the difference between the first and suppression signals, variable gain means responsive to the difference signal, and means responsive to the range determination for controlling the magnitude of the suppression signal and the gain of the variable gain means.

8. The system of claim 5 wherein adjacent ones of the signal amplitude ranges overlap each other.

9. A system for deriving an indication of the magnitude of a process variable derived from a detector deriving a first signal nonlinearly related to the process variable comprising first means for determining in which one of a plurality of signal amplitude ranges the first signal falls, means responsive to the determination for transforming the first signal into a second signal having approximately a linear variation as a function of the property over each of the ranges, and means responsive to the second signal for deriving a third signal having a magnitude $BW_T$ in accordance with $$BW_T = ax + b$$

where:
$x$ = the magnitude of the second signal,
$a$ and $b$ are constants dependent on the determination such that $BW_T$ is a continuous function over all of the ranges taken together.

10. The system of claim 9 further including means responsive to the third signal for applying a correction thereto approximately indicative of the deviation of the first signal from a true relationship of the process variable.

11. A method of deriving an indication of the magnitude of a process variable, comprising measuring the variable with a detector that derives a first signal nonlinearly related to the process variable, determining in which one of a plurality of signal amplitude ranges the first signal falls, in response to the range determination transforming the first signal into a second signal having approximately a linear variation as a function of the property over each of the ranges, said second signal extending between the same first and second limits in each of said ranges as a result of the transformation, and in response to the second signal deriving a third signal having a magnitude $BW_T$ in accordance with $$BW_T = ax + b$$

where:
$x$ = the magnitude of the second signal,
$a$ and $b$ are constants dependent on the determination such that $BW_T$ is a continuous function over all of the ranges taken together.

12. The method of claim 11 further including the step of applying a correction to the third signal approximately indicative of the deviation of the first signal from a true relationship of the process variable.

13. The method of claim 12 wherein the amount of applied correction is derived by calibrating the gauge response for different grades of the process variable, and making the correction to the third signal by an amount indicated by the grade of the process variable.

14. The method of claim 11 wherein the first and second signals are analog signals.

15. In combination, a nucleonic detector for deriving a first signal substantially exponentially related to a process variable being monitored by the detector, means for transforming the first signal into a second signal having approximately a linear variation as a function of the property over each of a plurality of signal amplitude ranges for the first signal, said second signal extending between the same first and second limits in each of said ranges, digital computer means responsive to the second signal for determining in which one of the plurality of signal amplitude ranges the first signal falls and for controlling the transforming means in response to the determined range, said computer means including means for deriving a third signal having a magnitude $BW_T$, in accordance with $$BW_T = ax + b$$

where:
$x$ = the magnitude of the second signal,
$a$ and $b$ are constants dependent on the determination such that $BW_T$ is a continuous straight line function over all of the ranges taken together.

16. The combination of claim 15 wherein the computer includes means for applying a correction to the third signal, said correction being approximately indicative of the deviation of the first signal from a true exponential relationship of the process variable.

17. The combination of claim 15 wherein the transforming means includes means for linearly combining a suppression signal and the first signal to derive a difference signal indicative of the difference between the first and suppression signals, variable means responsive to the difference signal, and means responsive to the range determination for controlling the magnitude of the suppression signal and the gain of the variable gain means.

18. The system of claim 15 wherein adjacent ones of the signal amplitude ranges overlap each other.

19. A method of deriving in indication of the magnitude of a process variable comprising measuring the variable with a detector that derives a first signal nonlinearly related to the process variable, transforming the first signal into a second signal having approximately a linear variation as a function of the property over each of the ranges, said second signal extending between the same first and second limits in each of said ranges, in a digital computer means responsive to the second signal performing the steps of: (a) determining in which one of a plurality of signal amplitude ranges the first signal falls and in response to the range determination controlling the transformation step, and (b) deriving a third signal having a magnitude $BW_T$, in accordance with $$BW_T = ax + b$$

where:
$x$ = the magnitude of the second signal,
$a$ and $b$ are constants dependent on the determination such that $BW_T$ is a continuous function over all of the ranges taken together.

20. The method of claim 19 including the step of applying in the computer means a correction to the third signal approximately indicative of the deviation of the first signal from a true relationship of the process variable.

21. The method of claim 20 wherein the amount of applied correction is derived by calibrating the gauge response for different grades of the process variable, and making the correction to the third signal by an amount indicated by the grade of the process variable.

22. In combination, a nucleonic detector for deriving a first signal substantially exponentially related to a process variable being monitored by the detector, first means for determining in which one of a plurality of signal amplitude ranges the first signal falls, means responsive to the determination for transforming the first signal into a second signal having approximately a linear variation as a function of the property over each of the ranges, and means responsive to the second signal for deriving a third signal having a magnitude $BW_T$ in accordance with $$BW_T = ax + b$$

where:
$x$ = the magnitude of the second signal,
$a$ and $b$ are constants dependent on the determination such that $BW_T$ is a continuous straight line function over all of the ranges taken together.

23. A method of calibrating each of a plurality of gauges adapted to monitor a property nonlinearly related to the gauge output response so that there is derived in response to measurements by each gauge approximately the same signal magnitude versus property functional relationship, said gauge output responses as a function of the property being generally different from each other and being approximately in accordance with a theoretical response that is the same for all of the gauges, comprising the steps of dividing the theoretical response of the gauges into a number of ranges, for each of said gauges suppressing the gauge output responses by the same amount and supplying the same gain factor to the gauge output responses, the amount of suppression and gain factor being dependent upon the theoretical response, the amount of suppression and gain factor being different for each of the ranges, whereby the gauge output responses are modified, and altering the modified output responses by an amount indicative of the deviation of each individual gauge from the theoretical response.

24. The method of claim 23 wherein the modified output responses are altered in accordance with the same relationship over all of the ranges for a particular property classification.

25. The method of claim 24 wherein the modified responses are altered for different property classifications.

26. The method of claim 23 wherein the modified responses are altered for different property classifications.

27. The method of claim 23 wherein each of said gauges has an output response that is approximately an exponential function versus the property value, and the theoretical response is an expotential function versus the property value.

28. The method of claim 23 wherein the amount by which the modified output responses are altered is derived by calibrating the guage response for different grades of the process variable, and making the alteration by an amount indicated by the grade of the process variable.

29. A method of calibrating each of a plurality of gauges adapted to monitor a property nonlinearly related to the gauge output response so that there is derived in response to measurements by each gauge approximately the same signal magnitude versus property functional relationship, said gauge output responses as a function of the property being generally different from each other and being approximately in accordance with a theoretical response that is the same for all of the gauges, comprising for each of said gauges suppressing the gauge output responses by the same amount and applying the same gain factor to the gauge output responses, the amount of suppression and gain factor being dependent upon the theoretical response, whereby the gauge output responses are modified, and altering the modified output responses by an amount indicative of the deviation of each individual gauge from the theoretical response.

30. The method of claim 29 wherein for each of the gauges the output response is transformed into approximately a linear relationship between the gauge response and the property by the suppressing and gain factor supplying steps for each of a plurality of ranges of the gauge output.

31. The method of claim 29 further including determining in which one of a plurality of signal amplitude ranges the first signal falls and in response to the range determination controlling the transformation step.

32. A method of calibrating each of a plurality of gauges adapted to monitor a property nonlinearly related to the gauge output response so that there is derived in response to measurements by each gauge approximately the same signal magnitude versus property functional relationship, said gauge output responses as a function of the property being generally different from each other and being approximately in accordance with a theoretical response that is the same for all of the gauges, comprising modifying the output response of each gauge by at least one factor that is the same for all of the gauges and is dependent upon the theoretical response, and altering the modified output responses by an amount indicative of the deviation of each individual gauge from the theoretical response.

33. A method of calibrating each of a plurality of gauges adaped to monitor a property nonlinearly related to the gauge output response so that there is derived in response to measurements by each gauge approximately the same signal magnitude versus property functional relationship, said gauge output responses as a function of the property being generally different from each other and being approximately in accordance with a theoretical response that is the same for all of the gauges, comprising modifying the output response of each gauge by two factors that are the same for all of the guages and are dependent upon the theoretical response, and altering the modified output responses by an amount indicative of the deviation of each individual gauge from the theoretical response.

34. The method of claim 33 wherein for each of the gauges the output response is transformed by the two factors into approximately a linear relationship between the gauge response and the property, the transformation being provided for each of a plurality of ranges of the gauge output.

35. The method of claim 33 further including determining in which one of a plurality of signal amplitude ranges the first signal falls and in response to the range determination controlling the transformation step.

36. A method of calibrating each of a plurality of gauges adapted to monitor a property nonlinearly related to the gauge output response so that there is derived in response to measurements by each gauge approximately the same magnitude versus property functional relationship, said gauge output responses as a function of the property being generally different from each other and being approximately in accordance with a theoretical response that is the same for all of the gauges, comprising in a computer: storing a set of suppression values and gain setting values for different amplitude ranges of the theoretical response, said stored suppression and gain setting values being the same for each of the gauges, determining the amplitude range of the gauge output response, in response to the range determination retrieving one of the suppression values and one of the gain setting values; suppressing the gauge response by the retrieved suppression value, multiplying the gauge response by the retrieved gain setting value, whereby there is derived a modified gauge response; in a computer: storing another functional relationship dependent upon the deviation of the gauge response from the theoretical response, said another functional relationship being dependent on the deviation of each individual gauge response from the theoretical response, and altering the modified gauge response by the another functional relationship.

37. The method of claim 36 further including the steps of in the computer: storing a set of said another functional relationships, each of said another functional relationships being dependent upon a different one of a plurality of property classifications, in response to a selection of a property classification selecting the another functional relationship employed to alter the modified gauge response.

38. The method of claim 36 wherein for each of the gauges the output response is transformed into approximately a linear relationship between the gauge response and the property by the suppressing and gain factor supplying steps for each of a plurality of ranges of the gauge output.

39. The method of claim 36 further including determining in which one of a plurality of signal amplitude ranges the first signal falls and in response to the range determination controlling the transformation step.

40. A method of deriving approximately the same magnitude versus property functional relationship from each of a plurality of gauges adapted to monitor the property, said property being nonlinearly related to the output response of a detector included in the gauge, said gauges output responses as a function of the property being generally different from each other and being approximately in accordance with a theoretical response that is the same for all of the gauges, comprising modifying the output response of each detector by at least one factor that is the same for all of the gauges and is dependent upon the theoretical response, and altering the modified output responses by an amount indicative of the deviation of each individual gauge from the theoretical response.

41. A system for deriving an indication of the magnitude of a process variable derived from a detector deriving a first signal nonlinearly related to the process variable comprising means for transforming the first signal into a second signal having approximately a linear variation as a function of the property over each of a plurality of signal amplitude ranges for the first signal ranges, said second signal extending between first and second limits in each of said ranges, digital computer means responsive to the second signal for determining in which one of the plurality of signal amplitude ranges the first signal falls and for controlling the transforming means in response to the determined range, said computer means including means for deriving a third signal having a magnitude $BW_T$ that is a continuous function over all of said ranges taken together and is dependent upon the magnitude of the second signal and includes constants dependent on the range determination.

42. The system of claim 41 wherein the computer includes means for applying a correction to the third signal, said correction being approximately indicative of the deviation of the first signal from a true relationship of the process variable.

43. The system of claim 41 wherein the transforming means includes means for linearly combining a suppression signal and the first signal to derive a difference signal indicative of the difference between the first and suppression signals, and means responsive to the range determination for controlling the magnitude of the suppression signal.

44. A system as claimed in claim 41 wherein said second signal extends between the same first and second limits in each of said ranges.

45. A system for deriving an indication of the magnitude of a process variable derived from a detector deriving a first signal nonlinearly related to the process variable comprising first means for determining in which one of a plurality of signal amplitude ranges the first signal falls, means responsive to the determination for transforming the first signal into a second signal having approximately a linear variation as a function of the property over each of the ranges, and means responsive to the second signal for deriving a third signal having a magnitude $BW_T$ that is a continuous function over all of said ranges taken together and is dependent upon the magnitude of the second signal and includes constants dependent on the range determination.

46. The system of claim 45 further including means responsie to the third signal for applying a correction thereto approximately indicative of the deviation of the first signal from a true relationship of the process variable.

47. A method of deriving an indication of the magnitude of a process variable comprising measuring the variable with a detector that derives a first signal nonlinearly related to the process variable, determining in which one of a plurality of signal amplitude ranges the first signal falls in response to the range determination, transforming the first signal into a second signal having approximately a linear variation as a function of the property over each of the ranges, said second signal extending between first and second limits in each of said ranges, and deriving a third signal having a magnitude $BW_T$ that is a continuous function over all of said ranges taken together and is dependent upon the magnitude of the second signal and includes constants dependent on the range determination.

48. The method of claim 47 further including the step of applying a correction to the third signal approximately indicative of the deviation of the first signal from a true relationship of the process variable.

49. A method of deriving an indication of the magnitude of a process variable comprising measuring the variable with a detector that derives a first signal nonlinearly related to the process variable, transforming the first signal into a second signal having approximately a linear variation as a function of the property over each of the ranges, said second signal extending between first and second limits in each of said ranges, in a digital computer means responsive to the second signal performing the steps of: (a) determining in which one of a plurality of signal amplitude ranges the first signal falls and controlling the transformation in response to the determined range, and (b) deriving a third signal having a magnitude $BW_T$ that is a continuous function over all of said ranges taken together and is dependent upon the magnitude of the second signal and includes constants dependent on the range determination.

50. A method of deriving approximately the same magnitude versus property functional relationship from each of a plurality of gauges adapted to monitor the property, said property being nonlinearly related to the output response of a detector included in the gauge, said gauge output responses as a function of the property being generally different from each other and being approximately in accordance with a theoretical response that is the same for all of the gauges, comprising the steps of dividing the theoretical response of the gauges into a number of ranges, for each of said gauges suppressing the gauge output responses by the same amount that is dependent upon the theoretical response and is different for each of the ranges, whereby the gauge output responses are modified, and altering the modified output responses by an amount indicative of the deviation of each individual gauge from the theoretical response.

51. The method of claim 50 wherein the modified output responses are altered in accordance with the same relationship over all of the ranges for a particular property classification.

52. The method of claim 51 wherein the modified responses are altered for different property classifications.

53. The method of claim 50 wherein the modified responses are altered for different property classifications.

54. The method of claim 50 wherein each of said gauges has an output response that is approximately an exponential function versus the property value, and the theoretical response is an exponential function versus the property value.

55. A method of deriving approximately the same magnitude versus property functional relationship from each of a plurality of gauges adapted to monitor the property, said property being nonlinearly related to the output response of a detector included in the gauge, said gauge output responses as a function of the property being generally different from each other and being approximately in accordance with a theoretical response that is the same for all of the gauges, comprising in a computer means: storing a set of suppression values for different amplitude ranges of the theoretical response, said stored suppression values being the same for each of the gauges, determining the amplitude range of the gauge output response, in response to the range determination retrieving one of the suppression values; suppression the gauge response by the retrieved suppression value, whereby there is derived a modified gauge response; in the computer means: storing another functional relationship dependent upon the deviation of the gauge response from the theoretical response, said another functional relationship being dependent on the deviation of each individual gauge response from the theoretical response, and altering the modified gauge response by the another functional relationship.

56. The method of claim 55 further including the steps of in the computer means: storing a set of said another functional relationships, each of said another functional relationships being dependent upon a different one of a plurality of property classifications, in response to a selection of a property classification selecting the another functional relationship employed to alter the modified gauge response.

57. A system for deriving an indication of the magnitude of a process variable derived from a detector deriving a first analog signal nonlinearly related to the process variable comprising analog circuitry responsive to the first analog signal for transforming the first analog signal into a second analog signal that is a piecemeal linear approximation of the first signal in each of a plurality of different amplitude ranges of the first signal, means for determining in which of the ranges the first analog signal lies, means for storing a plurality of predetermined signal magnitude which enable the analog circuitry to transform the first analog signal into the second analog signal, and means responsive to the range determination for applying to the analog circuitry the stored predetermined signal magnitudes which transform the first analog signal into the second analog signal in the determined range.

58. The system of claim 57 wherein the analog circuitry includes means for applying an analog suppression signal and a variable gain factor to the first analog signal, said storing means including means for storing a plurality of signals representing magnitudes for the suppression signal and the gain factor, and said means for applying including means for selecting one of the suppression representing signals and one of the gain factor representing signals for application to the analog circuitry.

59. The system of claim 58 wherein the storing means includes means for storing signals having magnitudes representing slope and intercept values for the different ranges to convert the second analog signal into a further signal that has magnitude values representing a continuous, approximately linear function of the process variable over all of the ranges.

60. The system of claim 59 wherein the magnitude of the further signal approximately represents a theoretical linear function, said magnitude of the further signal differing from the theoretical linear function by an amount indicative of the deviation of the process variable from a theoretical linear function, and means responsive to the value of at least one additional stored signal magnitude indicative of the deviation for altering the value of the further signal.

61. The system of claim 57 wherein the analog circuitry includes means for applying an analog suppression signal to the first analog signal, said storing means including means for storing a plurality of signals representing magnitudes for the suppression signal, and said means for applying including means for selecting one of the suppression representing signals for application to the analog circuitry.

62. The system of claim 57 wherein the analog circuitry includes means for applying a variable gain factor to the first analog signal, said storing means including means for storing a plurality of signals representing magnitudes for the gain factor, and said means for applying including means for selecting one of the gain factor representing signals for application to the analog circuitry.

63. The system of claim 57 wherein the storing means includes means for storing signals having magnitudes representing values for the different ranges to convert the second analog signal into a further signal that has magnitude values representing a continuous, approximately linear function of the process variable over all of the ranges.

64. The system of claim 63 wherein the magnitude of the further signal approximately represents a theoretical linear function, said magnitude of the further signal differing from the theoretical linear function by an amount indicative of the deviation of the process variable from a theoretical linear function, and means responsive to the value of at least one additional stored signal magntiude indicative of the deviation for altering the value of the further signal.

65. A method of deriving an indication of the magnitude of a process variable, comprising measuring the variable with a detector that derives a first analog signal nonlinearly related to the process variable, the first analog signal being supplied to analog circuitry for transforming the first analog signal into a second analog signal that is a piecemeal linear approximation of the first signal in each of a plurality amplitude ranges of the first signal, determining in which of the ranges the first analog signal lies, storing a plurality of signal magnitudes which enable the analog circuitry to transform the first analog signal into the second analog signal, and in response to the determined range applying to the analog circuitry the stored predetermined signal magnitudes which transform the first analog signal into the second analog signal in the determined range.

66. The method of claim 65 wherein the analog circuitry includes means for applying an analog suppression signal and a variable gain factor to the first analog signal, said storing step including storing a plurality of signals representing magnitudes for the suppression signal and the gain factor, and said applying step including selecting one of the suppression representing signals and one of the gain factor representing signals for application to the analog circuitry.

67. The method of claim 66 wherein the storing step includes storing signals having magnitudes representing slope and intercpet values for the different ranges to convert the second analog signal into a further signal that has magnitude values representing a continuous, approximately linear function of the process variable over all of the ranges.

68. The method of claim 67 wherein the magnitude of the further signal approximately represents a theoretical linear function, said magnitude of the further signal differing from the theoretical linear function by an amount indicative opf the deviation of the process variable from a theoretical linear function, and responding to the value of at least one additional stored signal magnitude indicative of the deviation to alter the value of the further signal.

69. The method of claim 65 wherein the analog circuitry includes means for applying an analog suppression signal to the first analog signal, said storing step including storing a plurality of signals representing magnitudes for the suppression signal, and said applying step including selecting one of the suppression representing signals for application to the analog circuitry.

70. The method of claim 65 wherein the analog circuitry includes means for applying a variable gain factor to the first analog signal, said storing step including storing a plurality of signals representing magnitudes for the gain factor, and said applying step including selecting one of the gain factor representing signals for application to the analog circuitry.

71. The method of claim 65 wherein the storing step includes storing signals having magnitudes representing values for the different ranges to convert the second analog signal into a further signal that has magnitude values representing a continuous, approximately linear function of the process variable over all of the ranges.

72. The method of claim 71 wherein the magnitude of the further signal approximately represents a theoretical linear function, said magnitude of the further signal differing from the theoretical linear function by an amount indicative of the deviation of the process variable from a theoretical linear function, and responding to the value of at least one additional stored signal magnitude indicative of the deviation to alter the value of the further signal.

* * * * *